(12) United States Patent
Holstein

(10) Patent No.: US 6,342,946 B1
(45) Date of Patent: Jan. 29, 2002

(54) DEVICE FOR DETERMINING THE AXIAL POSITION OF HOLLOW CYLINDERS

(75) Inventor: Ole Holstein, Breitenburg (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/659,493

(22) Filed: Sep. 11, 2000

(30) Foreign Application Priority Data

Sep. 10, 1999 (DE) .......................................... 199 43 502

(51) Int. Cl.$^7$ .......................... G01C 15/00; G01C 1/00; G01B 11/26
(52) U.S. Cl. ........................ 356/152.1; 356/153; 33/286
(58) Field of Search .............................. 356/152.1, 153; 33/286

(56) References Cited

U.S. PATENT DOCUMENTS

| | | | |
|---|---|---|---|
| 4,272,191 A | * 6/1981 | Bergkvist | ................... 356/153 |
| 4,566,202 A | 1/1986 | Hamar | |
| 4,677,865 A | 7/1987 | Lehmann | |
| 4,690,556 A | * 9/1987 | Walker | |
| 5,296,915 A | * 3/1994 | Akesaka | ..................... 356/400 |
| 5,359,781 A | 11/1994 | Melville | |
| 5,461,793 A | 10/1995 | Melville | |
| 5,576,826 A | 11/1996 | Hamar | |
| 6,124,935 A | 9/2000 | Matthews | |
| 6,178,649 B1 | 1/2001 | Wu | |

FOREIGN PATENT DOCUMENTS

| | | |
|---|---|---|
| GB | 2 330 470 A | 4/1999 |
| JP | 10-009842 | 1/1998 |

OTHER PUBLICATIONS

European Search Report, Examiner:M. Beyfuβ, Date of Search: 11/22/200, 2 pages, Place of Search: München, Germany.

Agilent Technologies, Integrated CMOS Image Sensor with Digital Output and Timing Controller, 1 page.

Hamar Laser L–705/706 LineMaster Lasers, "LineMaster Lasers for Extruder and Bore Alignment", (http://www.hamarlaser.com/products/1705_706/1705–1.htm, 2 pages.

* cited by examiner

Primary Examiner—Stephen C. Buczinski
(74) Attorney, Agent, or Firm—Nixon Peabody LLP; David S. Safran

(57) ABSTRACT

A laser head is placed roughly centrally in a hollow cylinder with the capacity to rotate. The pertinent rotation motion of the laser head takes place essentially around the lengthwise axis of the hollow cylinder, while the alignment of the laser beam agrees only approximately with the lengthwise axis of the hollow cylinder. When the laser head turns, a hyperboloid-shaped family of light beams is generated. These light beams produce an essentially circular projection pattern on a target attached outside of the hollow cylinder. The projection pattern with its center defines a point on an ideal axis (core) which is assigned to the hollow cylinder. The invention is suitable especially for measuring shaft tunnels of ships, but also for laying piping systems with large dimensions such as pipelines.

9 Claims, 9 Drawing Sheets

DEVICE FOR DETERMINING THE AXIAL POSITION OF HOLLOW CYLINDERS

Figure 1:
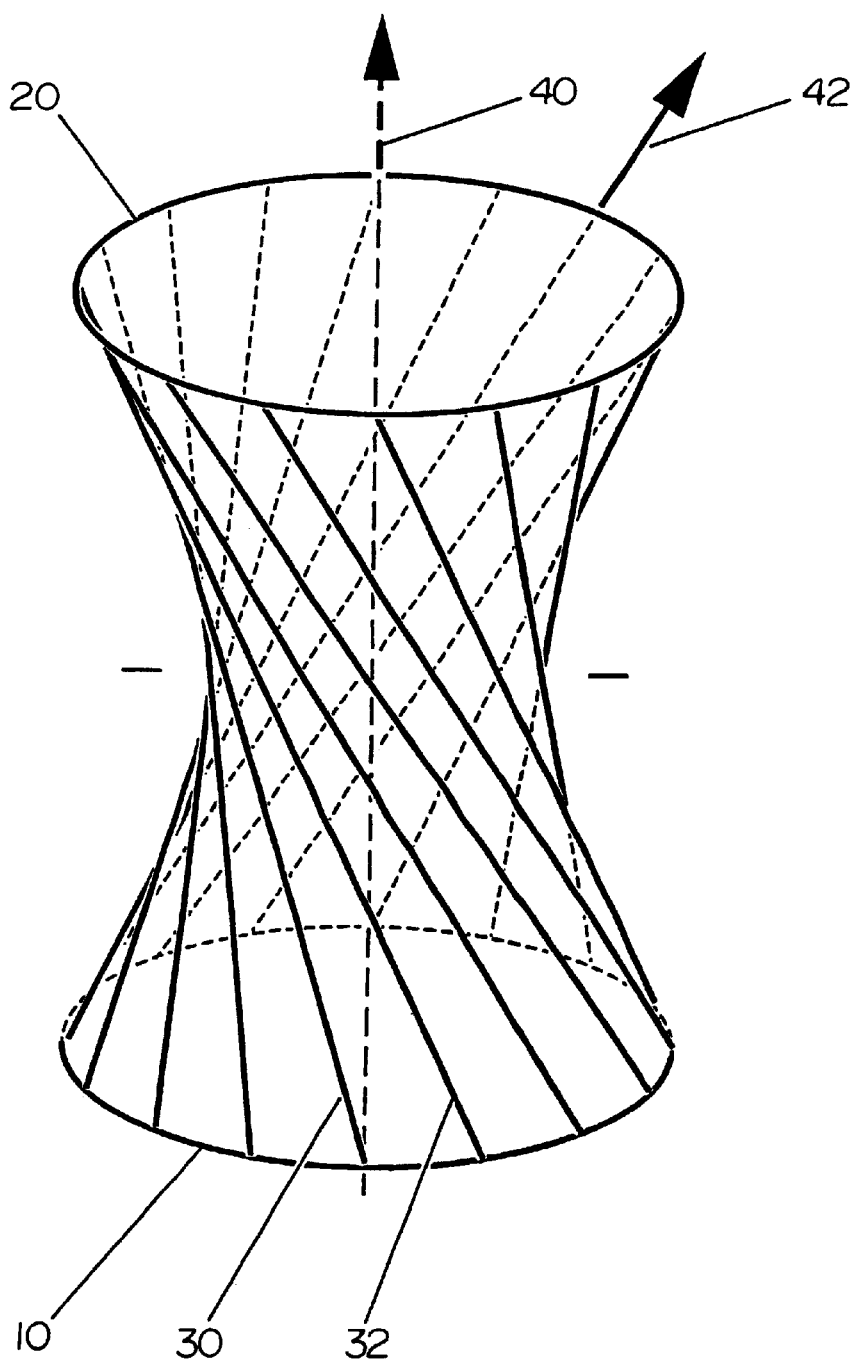

The invention relates to a device for determining the axial position of hollow cylinders. The determination and definition of the axes of hollow cylinders represent a certain problem, since the hollow cylinders to be measured have only roughly an ideal shape. Depending on the product and the product quality, the cross section of hollow cylinders over the axial length is only roughly circular and thus of variable radius. Still, it is possible to reach the center point for a stipulated cross section using a computation method to be stipulated, for example determining the center of gravity over the cross sectional surface. The center points are connected along the axis of a hollow cylinder by a line which however is exactly straight only in the ideal case. For precision applications, in practice a connecting line which is curved in space can be expected. It is often desirable to determine the center axis of hollow cylinders not only within or on the ends thereof, but also to extrapolate beyond its ends in order to be able to position succeeding machine parts in an exact manner. This is especially desirable when requirements according to a standard must be met, as for example standard DIN/ISO 9000. These precision applications can be for example: Precision tubing in the chemical industry or in nuclear power plants, shaft jacketing in shipbuilding, or production of gun barrels, etc.

The object, i.e. to devise one such measurement process which allows the recording of the axial position of the hollow cylinder even at some distance, is achieved with the features which are given in the independent claims.

The invention is based on the fact that inaccuracies in the position of a laser beam relative to its housing are not regarded as unwanted errors, but in contrast can be used as the basis of the measurement process as claimed in the invention. The beam position of a laser, for example a semiconductor laser, can typically be adjusted only with an effort to be exactly symmetrical to its housing dimensions. Normally a lateral offset (for example radial offset) and an angular offset with reference to the axis of symmetry of the housing can be expected. This results in that the location of a laser beam is typically askew to an ideal axis.

The invention is based on the finding that when one such askew axis is turned around an ideal axis the surface of a hyperboloid is defined. A target plane located perpendicular to the ideal axis is therefore cut in an exactly circular manner by the clamped hyperboloid surface. As claimed in the invention it is provided that a suitable device be prepared with which a laser beam which has been set randomly or intentionally askew can be turned relative to the ideal axis of a hollow cylinder and within the hollow cylinder. At some distance outside the hollow cylinder, in this way the laser beam on a target surface can produce circular lines which depending on the distance of the target from the hollow cylinder have different diameters. The magnitude of these diameters depends on to what extent the askew offset of the laser beam axis from the ideal axis of the hollow cylinder to be measured is present. To make available a suitable device, with which the required rotation, optionally the adjustment of different askew values of the laser beam can be carried out, the invention calls for rollers which can roll on the inner jacket of a hollow cylinder to be measured and for purposes of precise support with a clamping device can be placed against its inside diameter. Preferably the clamping device is made similar to joints of an umbrella, but can also be implemented by clamping cones or comparable structures. Advantageously as claimed in the invention there are two clamping devices which can be adjusted independently of one another and which are otherwise structurally roughly identical or interchangeable. To produce a light beam, especially a laser light beam, a battery-operated semiconductor laser is advantageously used. The laser light source can be turned by hand or using a motor. For motorized drive, in addition to electricity, also compressed air can be provided, for example in the form of a slow-speed turbine engine. Especially economical targets are commercial air rifle targets which are used once and facilitate the marking of an ideal position with one prick or the like on a reference surface. For more precise measurements it can be provided that the middle point position of a circular ring projected by a laser beam be determined with optoelectronic means, for example using a so-called CCD sensor, in interaction with a computer.

Figure 2:
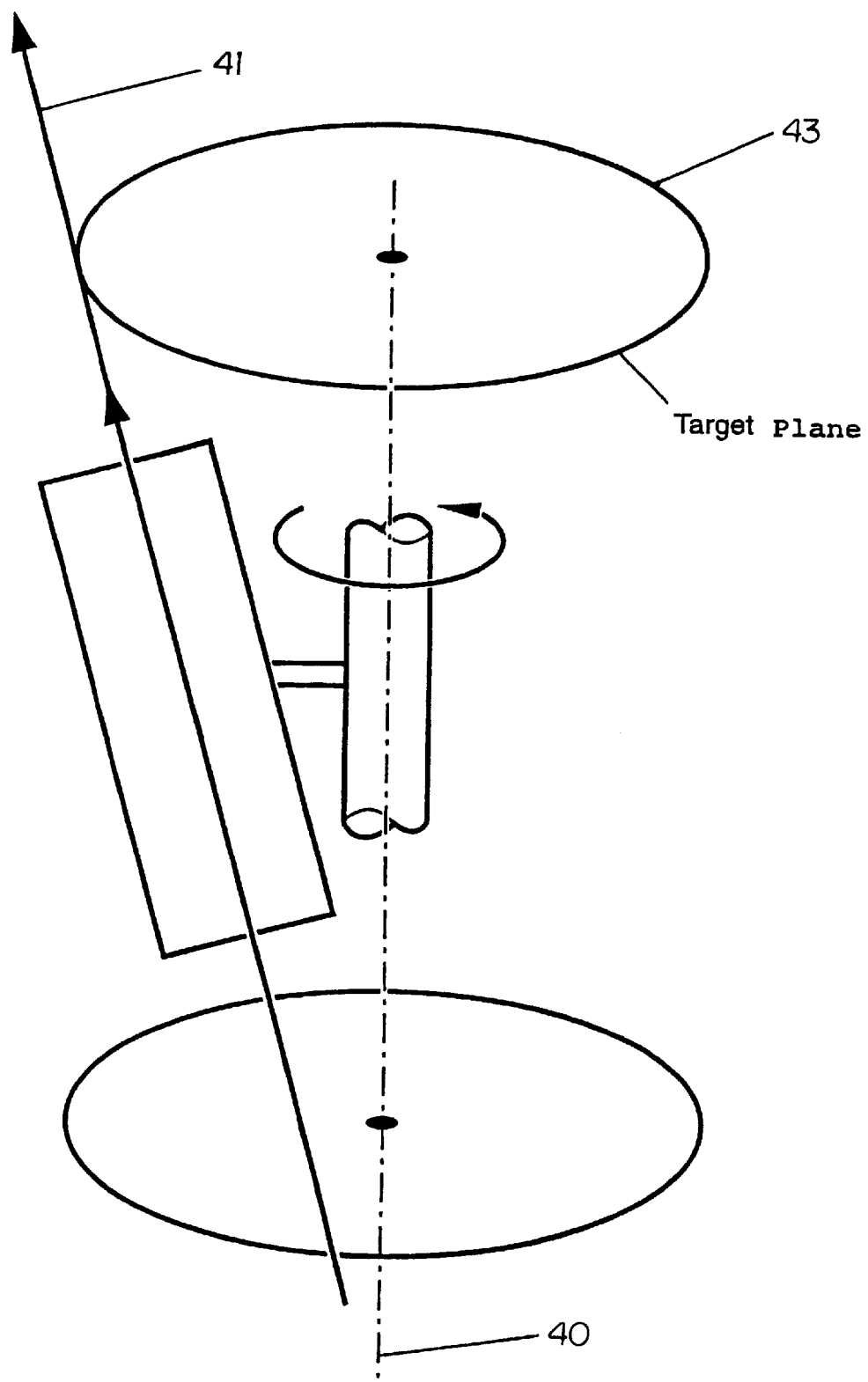
Figure 3:
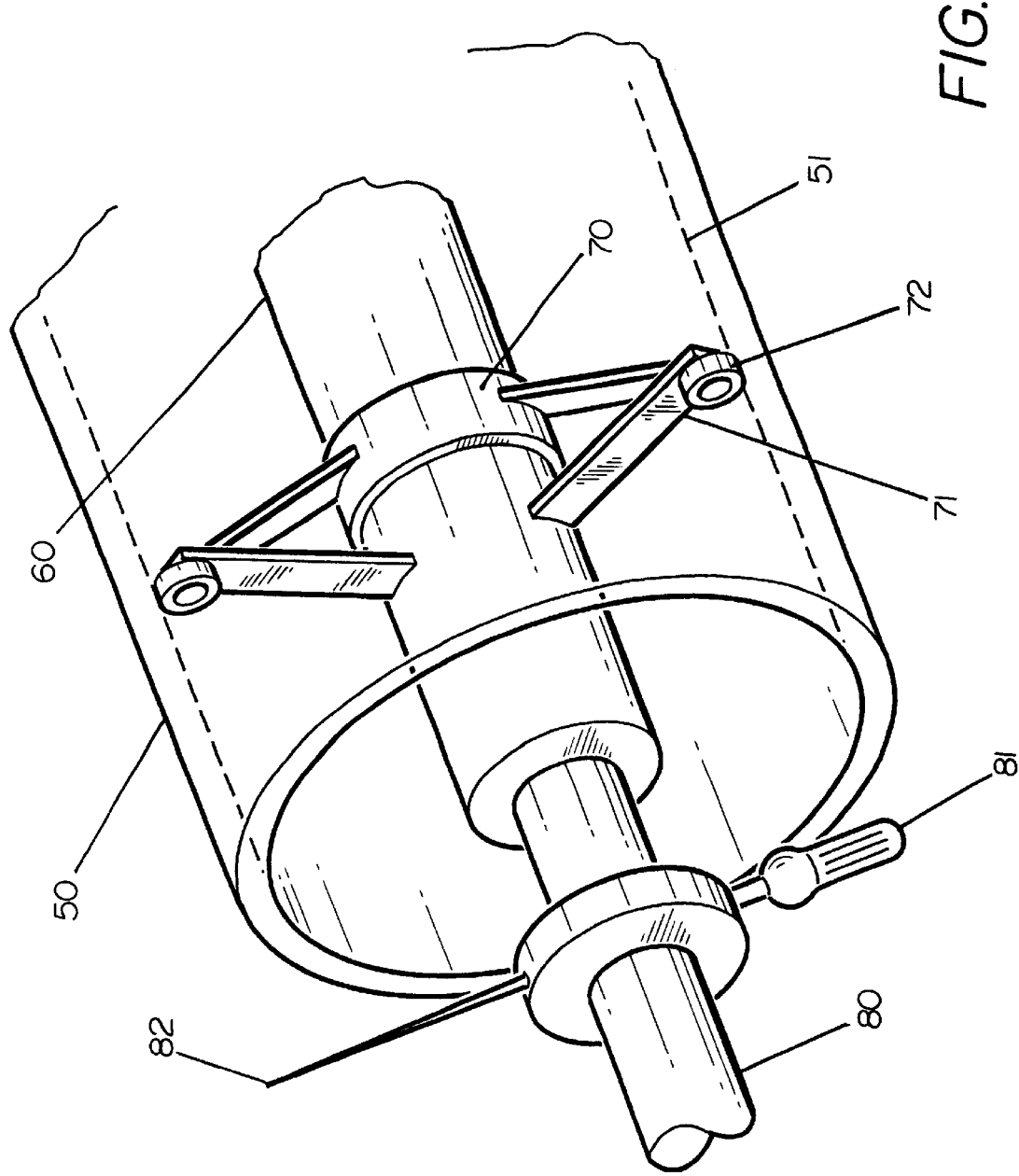
Figure 4:
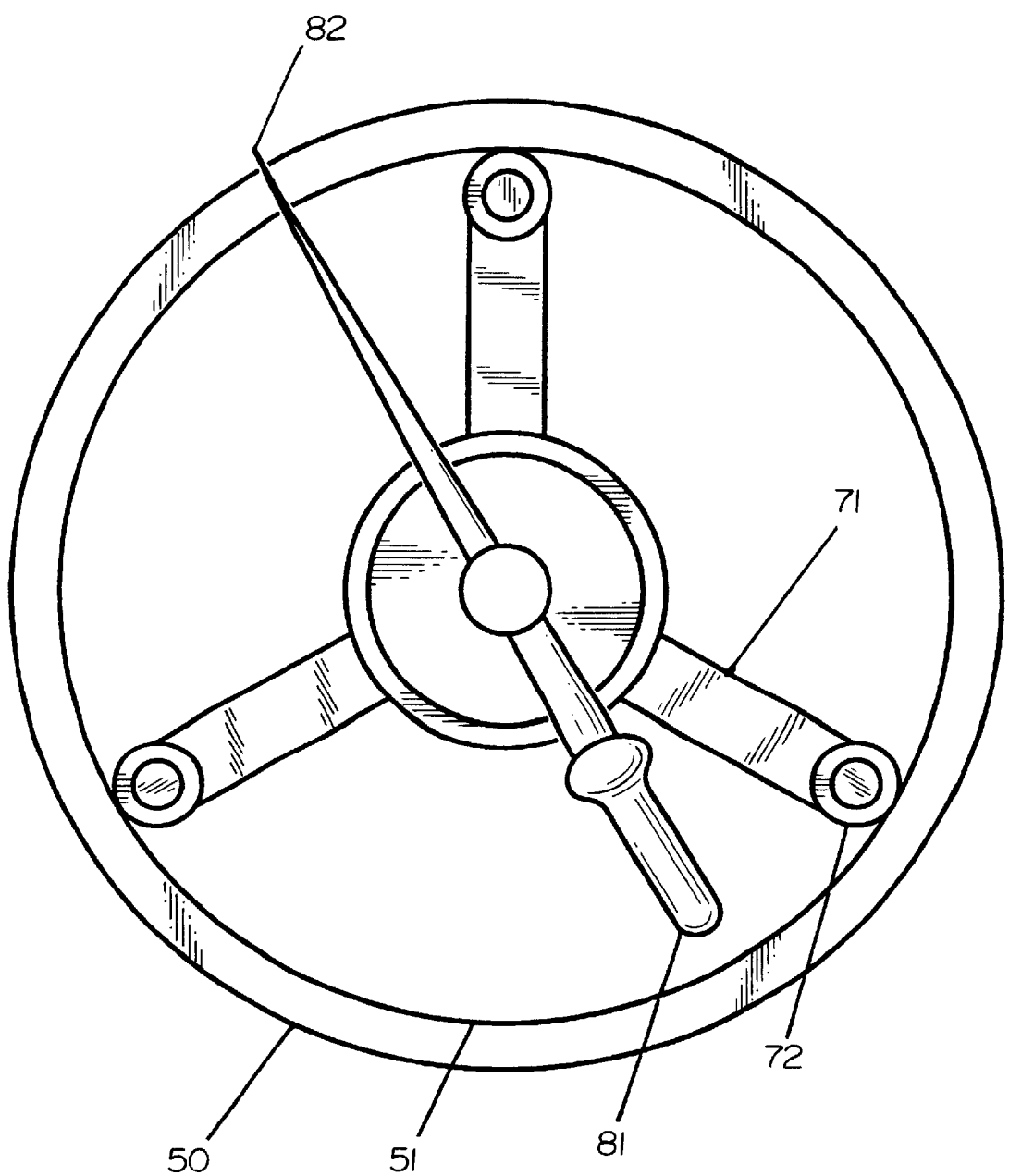
Figure 5:
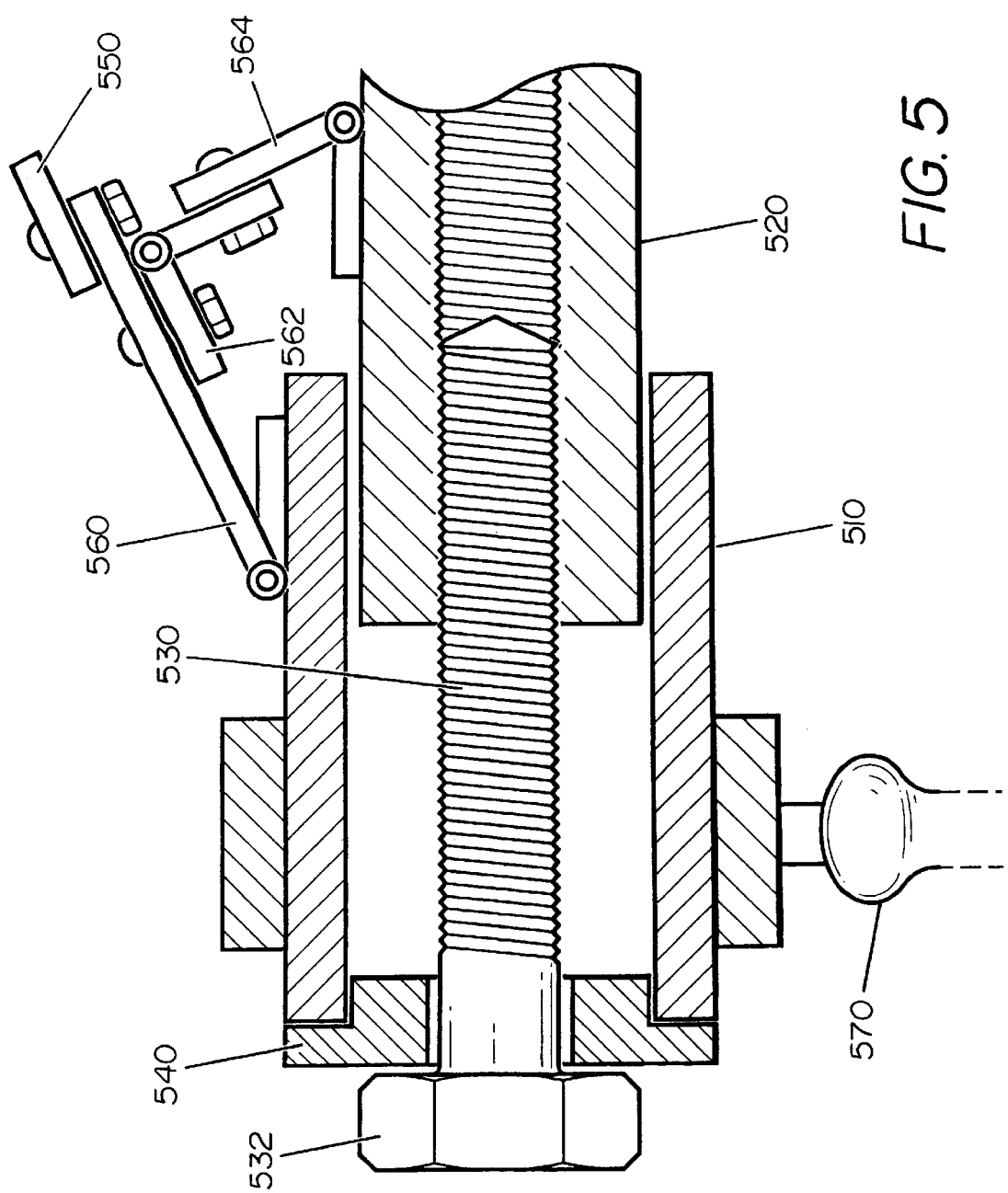
Figure 6:
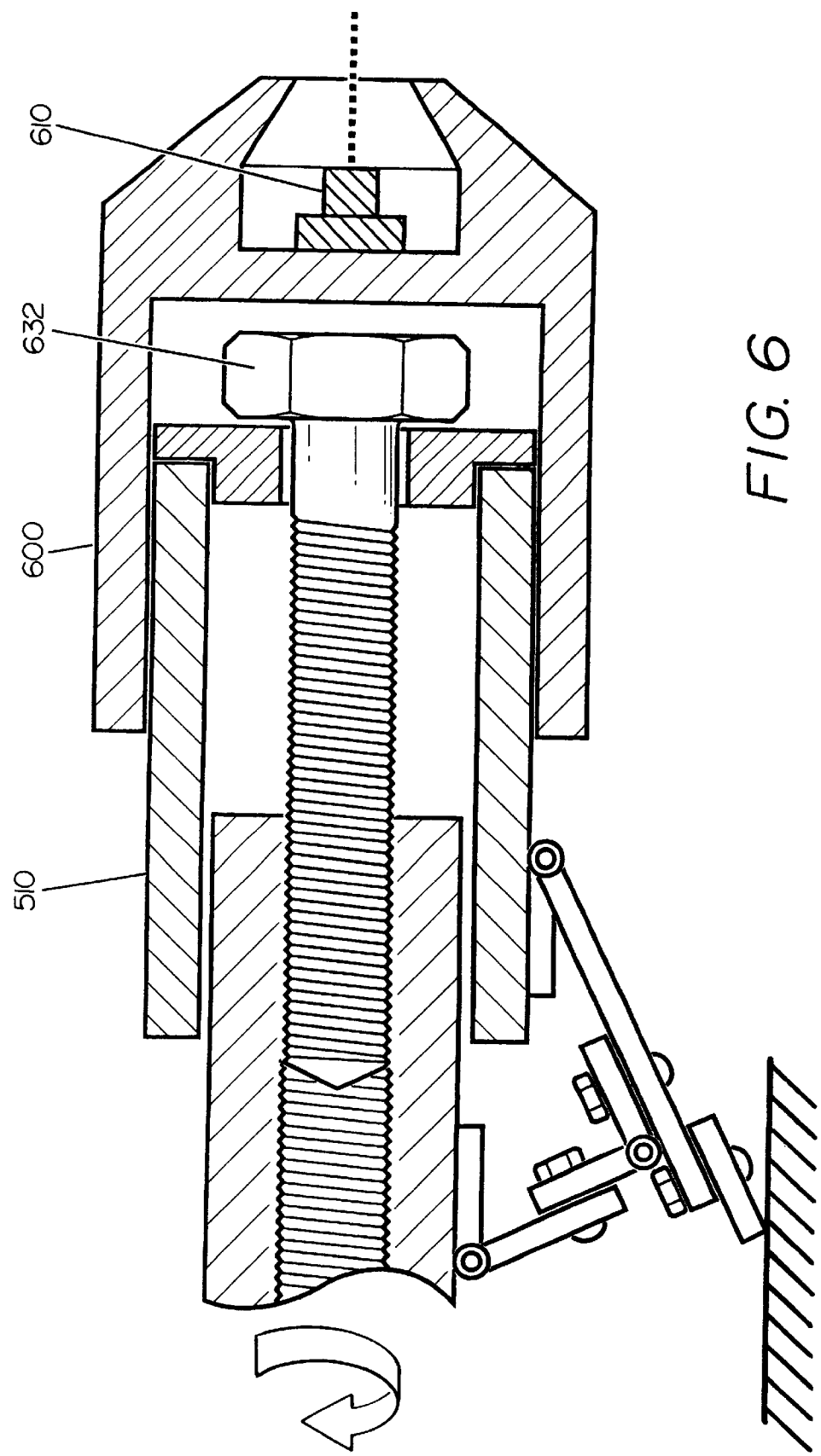
Figure 7:
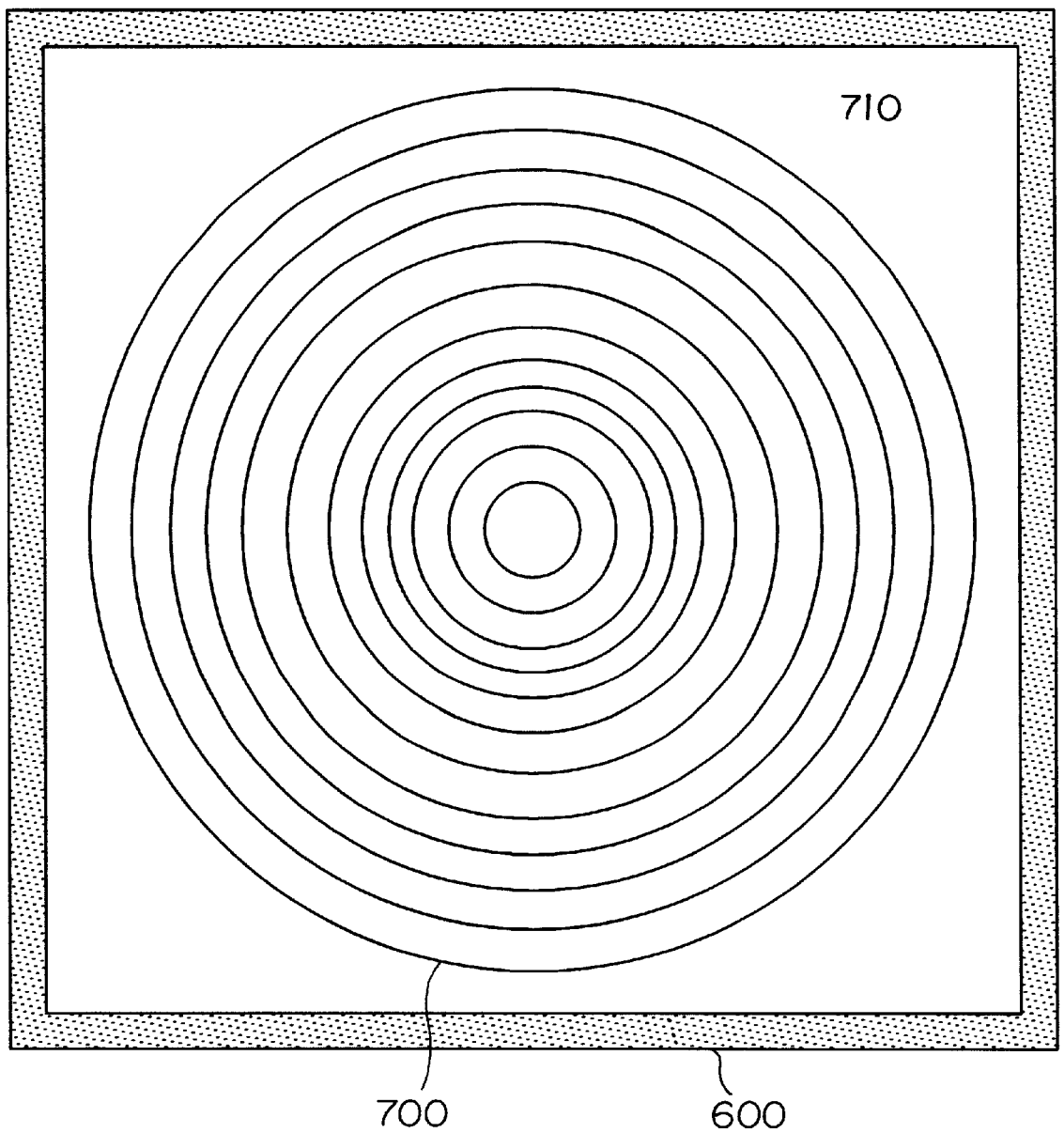
Figure 8:
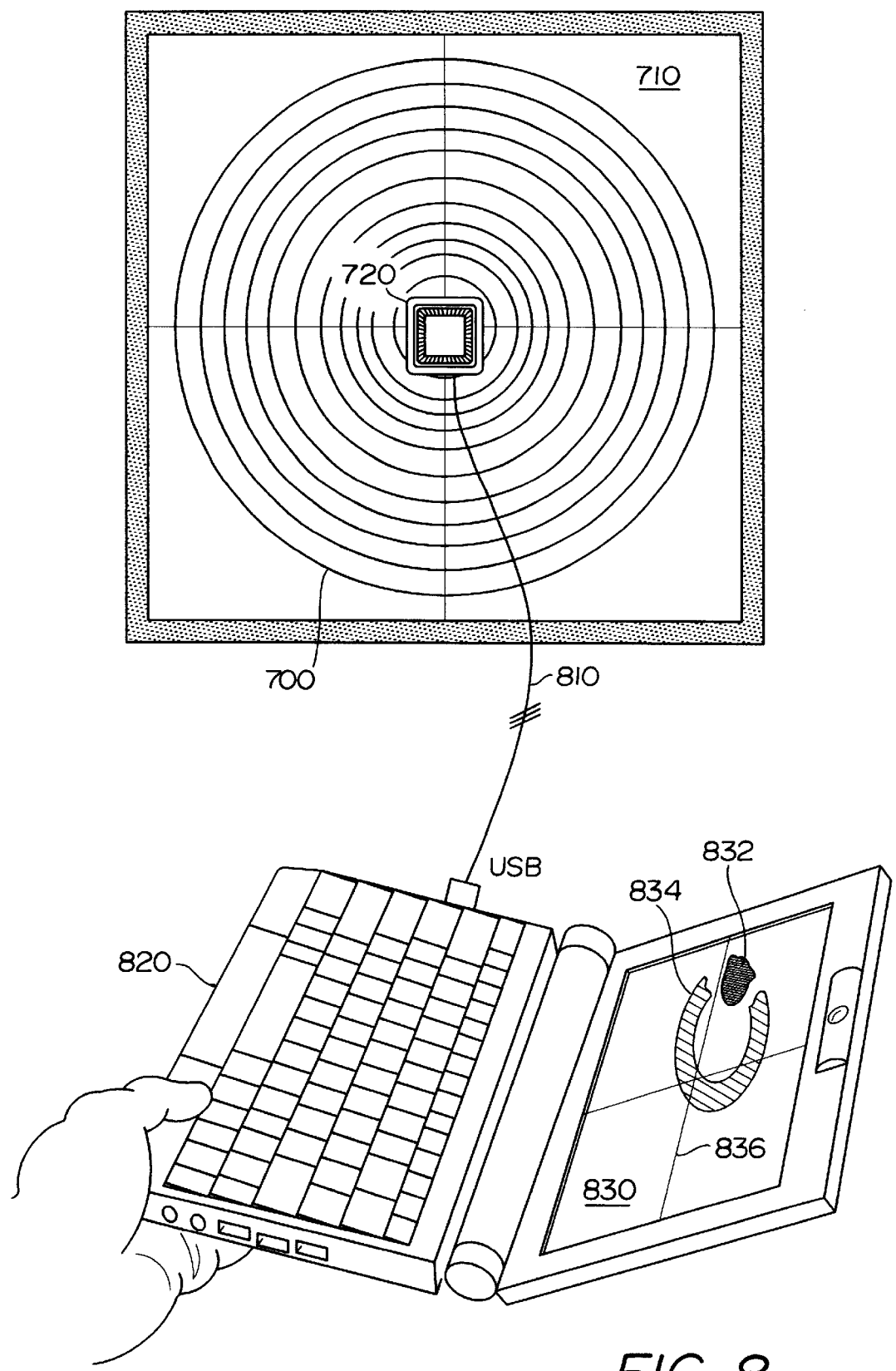
Figure 9:
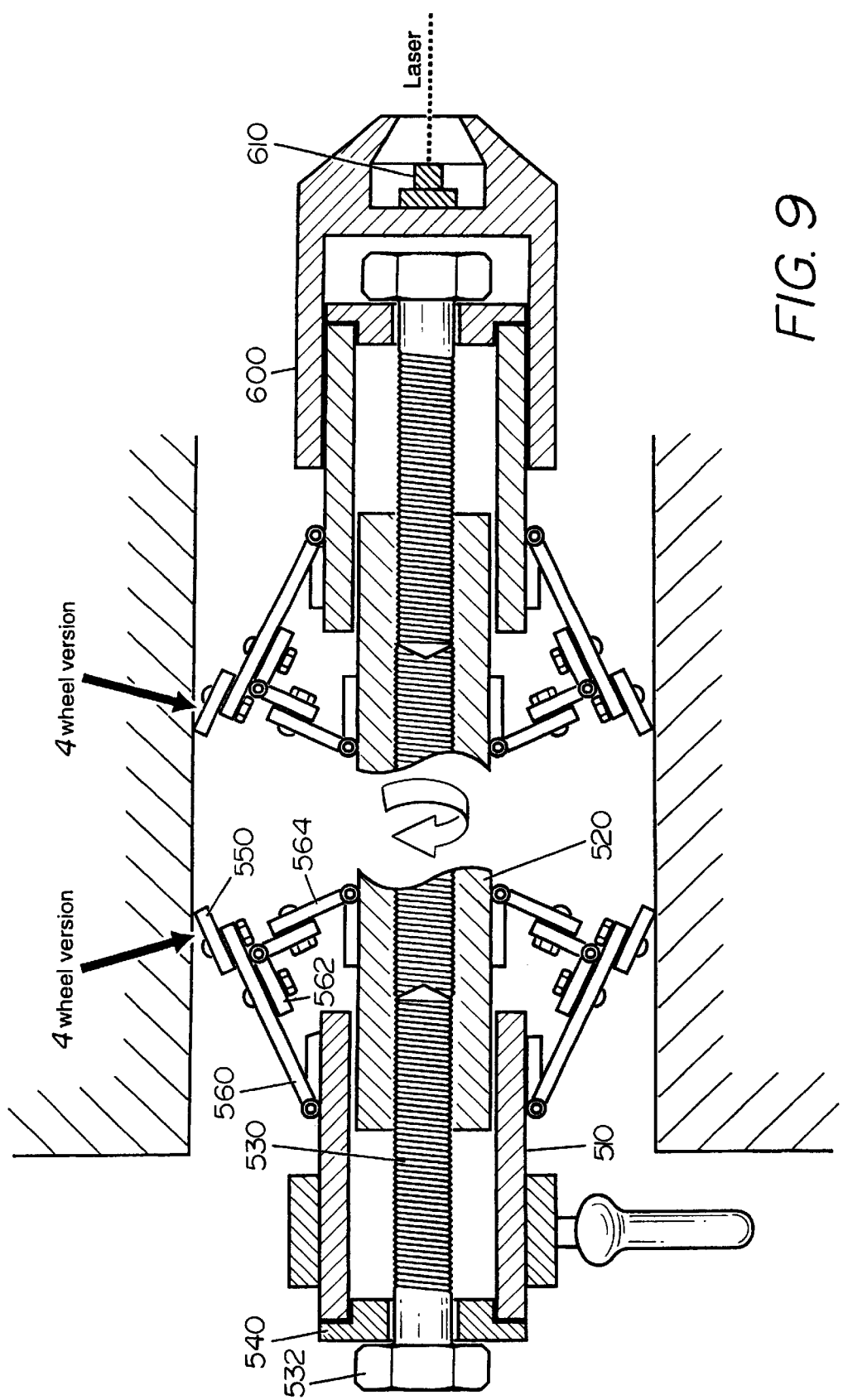

The invention is explained in particular using drawings:

FIG. 1 shows the generation of a hyperboloid of one sheet by a pertinent family of lines FIG. 2 shows the generation of a hyperboloid surface by a laser beam which is turned around a reference axis and the circular border of a pertinent cut surface FIG. 3 shows the schematic arrangement of a first clamping device piece in the hollow cylinder FIG. 4 shows an overhead view of the clamping device piece in the direction of the axis of the hollow cylinder FIG. 5 shows structural details for the first clamping device piece with which the device is turned around one axis FIG. 6 shows structural details for a second clamping device piece which is turned and which contains a laser light source FIG. 7 shows a target printed with circular rings for determining the center of the circle FIG. 8 shows a schematic representation of a target which is equipped with a two-dimensionally acting CMOS sensor, the sensor being connected to a portable computer FIG. 9 shows a cross-sectional view for an assembled arrangement as shown in FIGS. 5 and 6.

As FIG. 1 shows, in the conventional manner a hyperboloid surface can be represented by a line 30, 32 arranged askew being rotated around a reference line 40. As illustrated by the arrow 42, the hyperboloid is stretched without limit. Perpendicular to the reference line which defines the axis of symmetry, a line which has been rotated around the reference line produces exact circular rings (for example 10, 20) on the corresponding cut surfaces.

The invention proceeds from the finding that a laser beam which has been turned around a reference axis does not define an exact cone, but the surface of a hyperboloid. The parameters of one such surface can be varied by the laser beam acquiring a different distance from the reference axis, or its angle with respect to a reference axis being set differently. The projection of a laser beam which has been set in this way onto a distant target surface will typically yield circles if the target surface is oriented perpendicularly to the reference axis. The corresponding conditions are shown in FIG. 2.

FIGS. 3 and 4 show in a partial view an approach with which precise rotation of a laser light source around the so-called "core", i.e. the axis of symmetry of a hollow cylinder, can be turned. The device as claimed in the invention calls for providing a pipe section which is to be located centrally in the hollow cylinder and to be turned there with a rotatable clamping device and supporting it with the latter. The clamping device has several joints as are known for example of the construction of a (sun)shade. To the periphery of the joint arms precision rollers are attached which can roll on the inner wall of the hollow cylinder. The embodiment of the rollers is optional, but deep groove ball bearings are especially suitable.

The clamping device shown in FIG. 3 is complemented by a second one of the same type by which the centrally arranged pipe section on its other end is made to be centered and turned. The central pipe section has a length of roughly 5% to 90% of the hollow cylinder, for example roughly 5 m length for a hollow cylinder 20 m long. Due to the rotary support the central pipe section can therefore also be carefully moved back and forth in its lengthwise direction in the hollow cylinder. To do this there is an extension tube (shown in FIG. 3 as an attachment) with which the central pipe section is not only turned, but can especially also be pushed. The orientation of the extension tube is completely noncritical; there can also be a stable helical spring or a plastic hose for the indicated purposes, if a rounded hollow cylinder section is to be measured. The extension tube can be provided with a handle, as shown, so that the required rotary motion can be executed. Instead of a handle, preferably a motorized drive which is not shown is used with which for example the extension tube and thus the central pipe section can be caused to rotate. As is shown in FIG. 4, for defined adjustment of the rotary position of the central pipe section there is a measurement pointer which however is kept smaller in a motorized drive or can be omitted.

Details on matching of the first clamping device 500 to the diameter of the hollow cylinder to be measured are shown in FIG. 5. It is apparent that the corresponding end of the central pipe section consists of two pipes 510, 520 which can be moved against one another, of which only part of pipe 520 is shown, and which can have a considerable length. It is provided with an internal thread into which a tightening screw 530 fits which can be actuated on the screw head 532. The latter rests on an abutment 540. The indicated handle or extension device is attached to the pipe 510. When the tightening screw 530 is actuated the distance of the hinges 560, 564 is shortened or lengthened; they are connected by a hinge 562 so that the ball bearing 550 is moved radially away from the axis of rotation or for example can be withdrawn with a return spring which is not shown. It goes without saying that the tightening screw must be actuated with limited torque, best by hand, in order to prevent damage to the measurement device or the hollow cylinder. The other rollers and hinges (a total of at least three per clamping device) are not shown for reasons of clarity.

FIG. 6 shows the remainder of the mechanism. The second clamping device is essentially comparable to the first. But there is the difference that instead of a rotary handle or an extension means a laser beam head 600 can be clamped onto the pipe 510, for example, by screwing it on or simply by slipping it on. This is however only done when the second clamping device has been set to the inside diameter of the hollow cylinder to be measured by actuating the tightening screw 632. The laser beam head 600 contains a diode laser together with a battery-operated power supply and switch for turning on and off. The diode laser radiates roughly in the direction of the axis of rotation and can optionally be set specifically radially to it and/or obliquely to it.

After inserting the laser beam head into the hollow cylinder, then the remainder of the measurement arrangement can be placed in the hollow cylinder, optionally with matching of the diameter of the rear clamp piece to the hollow cylinder. After completion of these preliminary efforts the entire measurement arrangement is caused to rotate with axial displacement in the direction of the hollow cylinder. A target which is attached at a distance to a reference surface (FIG. 7) is pushed on the latter until its print pattern lies concentrically to the circles or circle arcs which are produced by the laser beam on the target when the laser head or the intermediate piece is turned. It goes without saying that in special cases these circles can also be reduced in size to a point-like solid circle.

FIG. 8 shows the use of the invention in cooperation with an optoelectronic sensor 720 which can be read out two-dimensionally, for example a CMOS sensor of the HDCS 2000 type. The latter is located in the center of the target 710 so that its effectively illuminatable area with a diagonal of roughly 8 mm can be illuminated by a relatively well centered laser beam. If necessary an optical aperture enlargement can be connected in front of the sensor 720. It can consist of a large-area, red-colored diffusing screen measuring roughly 10×10 cm, and a focussing lens with a short focal length of roughly 5 to 15 mm. This focussing lens acts for the sensor in the manner of a photographic objective lens. A light spot which strikes the diffusing screen can then be projected onto the sensitive surface of the sensor 720 in transmission. The red-colored diffusion screen can feasibly be combined with a Fresnel or focussing lens in order to improve the indicated projection behavior.

The sensor 720 is provided with suitable, commercially available extra electronics so that it can be connected by serial USB signal cable 810 to a portable computer 820 as is commercially available for example from Sony. On its display 830 the laser beam striking the sensor 720 can be reproduced as a light spot display 832. When the measurement device is turned the positions of one such light spot change. These positions can be buffered by the computer and displayed in the form of an arc 834. As is apparent from FIG. 8, the target 710 is then centered on the axis of the hollow cylinder only when the arc 834 is centered with respect to the reticle 836. Determination of the indicated central or eccentric position of the arc 834 can be done by the software of the computer 820.

FIG. 9 shows in a full cross sectional representation the individual parts explained in FIGS. 5 and 6. For reasons of simplification of the drawings, a 4-wheel version of the clamping devices is shown. As explained above, there can preferably be a 3-wheel construction of the clamping devices.

I claim:

1. A system for determining the axial position of a hollow cylinder, said system comprising:
   a laser head including a laser for emitting a beam of laser light in an axial direction which is not matched precisely to an axial direction of the hollow cylinder; and
   a rotary device for mounting said laser head within the hollow cylinder,
   wherein said rotary device is adapted to cause said laser head to rotate along an inner surface of the hollow cylinder to thereby produce substantially circular projection patterns on a target attached at an area outside of the hollow cylinder,
   wherein said circular projection patterns have a center which defines a point on a longitudinal axis of the hollow cylinder.

2. The system as claimed in claim 1, wherein an effective outer diameter of said rotary device is matched to an inner diameter of the hollow cylinder.

3. The system as claimed in claim 1, wherein said rotary device includes a centrally-arranged tightening screw.

4. The system as claimed in claim 3, wherein said rotary device is manually actuated.

5. The system as claimed in claim 3, wherein said rotary device is motor-driven.

6. The system as claimed in claim 1, wherein said target is provided with preprinted circles.

7. The system as claimed in claim 1, further comprising an optoelectronic target which is two-dimensionally readable.

8. The system as claimed in claim 7, wherein said optoelectronic target comprises a pixel-orientated CMOS sensor.

9. The system as claimed in claim 7, further comprising a computer having a display screen for displaying a light spot position on the target and for computing an amount of centricity of the position relative to the target.

* * * * *